United States Patent

Hiramoto

[11] Patent Number: 5,590,895
[45] Date of Patent: Jan. 7, 1997

[54] COLLAPSIBLE BICYCLE FRAME

[75] Inventor: Koji Hiramoto, Hirakata, Japan

[73] Assignee: Exedy Corporation, Osaka, Japan

[21] Appl. No.: 396,831

[22] Filed: Mar. 1, 1995

[30] Foreign Application Priority Data

Mar. 8, 1994 [JP] Japan .................................. 6-037040

[51] Int. Cl.⁶ .................................................. B62K 15/00
[52] U.S. Cl. ........................................ 280/278; 280/287
[58] Field of Search ................................. 280/278, 287, 280/279, 280, 281.1, 276

[56] References Cited

U.S. PATENT DOCUMENTS

| | | | |
|---|---|---|---|
| 528,874 | 11/1894 | Hall | 280/272 |
| 1,584,314 | 5/1926 | Mamiya | 280/278 |
| 3,015,498 | 1/1962 | Tanaka et al. | 280/278 |
| 4,438,942 | 3/1984 | Hon | 280/287 X |
| 4,934,724 | 6/1990 | Allsop et al. | 280/283 X |
| 5,282,639 | 2/1994 | Chen | 280/287 |

FOREIGN PATENT DOCUMENTS 2280878  2/1995  United Kingdom.

*Primary Examiner*—Margaret A. Focarino
*Assistant Examiner*—Victor E. Johnson
*Attorney, Agent, or Firm*—Shinjyu Office of Patent Attorneys

[57] ABSTRACT

The frame (2) for a collapsible bicycle of the present invention includes a head tube (10), a front frame (11), a rear frame (12), a handlebar locking mechanism (14) and a frame locking mechanism (17). On the head tube (10) the front fork (4) is mounted to support the front wheel (5). The front frame (11) is coupled to the head tube (10) in a manner that allows the leading edge to freely rotate perpendicular around the axis using a bearing (13). The rear frame (12) is coupled to the front frame (11) in a manner that allows the leading edge to freely rotate perpendicular around the axis using a hinge (16) as well as be able to support the rear wheel (6) on other edges. The handlebar locking mechanism (14) locks and freely releases the head tube (10) and front frame (11). The frame locking mechanism (12) locks and freely releases the front frame (11) and rear frame (12).

5 Claims, 7 Drawing Sheets

5,590,895

COLLAPSIBLE BICYCLE FRAME

BACKGROUND OF THE INVENTION

1. Field of the Invention

The invention relates to a bicycle frame that is collapsible and which folds in a middle portion thereof, and more particularly to a bicycle frame which allows displacement of the front steering stem support housing during the collapsing process.

2. Description of the Related Art

Storage space is becoming rapidly becoming a luxury in many urban areas. Collapsible bicycles where the bicycle can be simply and easily collapsed for storage or transport and when not needed, are becoming more and more popular. After being collapsed, they can be compactly stored.

One such collapsible bicycle includes a portion of the bicycle frame between a head tube (which supports the front fork and steering stem) and hangar portion which can be folded by rotating around a generally upright hinge axis, are known. The bicycle frame includes a tube-shaped frame connecting the head tube and hangar portion; a hinge portion arranged in the middle of the frame to freely rotate perpendicular around the axis; a locking mechanism to lock and freely release the hinge portion. In this frame the frame collapses by releasing the lock of the hinge portion and folding the tube-shaped frame perpendicularly around the hinge.

PROBLEMS THE PRESENT INVENTION TRIES TO SOLVE

In the conventional folding mechanism described above, it is difficult to fold the bicycle frame with the bicycle placed on the ground because of the angles of the front and rear wheels with respect to the hinge portions when folding the bicycle frame. In order to fold the bicycle frame, the frame must be lifted off the ground, or the front steering stem rotated so that the front wheel is trained to roll as the bicycle frame is folded. More often than not, when the bicycle is collapsed, and the frame folded, the front wheel is typically dragged on the ground. If a person lifts the frame in order to collapse the bicycle, the force necessary to collapse the bicycle may be sufficient to cause injury to the individual. The folding and lifting movements may strain the person performing the operation, making it impossible to simply and quickly collapse the bicycle.

SUMMARY OF THE INVENTION

One of the purposes of this invention is to make the collapsing operation of a collapsible bicycle simple and quick.

In one aspect of the present invention, a collapsible bicycle frame includes a front frame member, a rear frame member configured to support a rear wheel, hinged to the front frame member for rotation about a first axis that is generally vertical when the bicycle frame is upright and in a generally rideable position, a head tube rotatably supported on the front frame member, a front fork stem configured to support a front wheel rotatably supported in the head tube, a first locking mechanism associated with the head tube which selectively locks the head tube to the front frame thus restricting movement of the head tube with respect to the front frame, and a second locking mechanism which selectively locks the front frame and rear frame thus restricting movement.

In another aspect of the invention, the bicycle frame the rear frame member further includes a seat tube configured to support a seat and a hangar portion that rotatably supports a gear crankset. Alternatively, the front frame member may be provided with a seat tube configured to support a seat.

In yet another aspect of the invention, the first locking mechanism selectively locks the head tube and the front fork stem thus restricting relative rotation therebtween. Further, the head tube is rotatable about a generally vertical second axis generally parallel to the first axis. The front fork stem is rotatable in the head tube about a third axis which is inclined at an acute angle with respect to the second axis.

When the bicycle frame is collapsed, the first locking mechanism and the second locking mechanism are released, and the head tube is rotated about the second axis and front frame is rotated about the first axis. Hence, the front frame and the rear frame fold around the first axis (and hinge). As the front and rear frames are folded, the head tube being rotatable about the second axis, allows the front wheel to roll on the ground during the folding process. Because of this, for instance, with the rear wheel locked using the brake, the front frame and rear frame can be easily folded by pulling the handlebar to the rear without straining the person due to rolling the front wheel on the ground to support the front fork. Conversely, when unfolding the bicycle, it can be easily returned to a riding state by only holding the handlebar with the front wheel on the ground and rotating by extending the front frame.

When collapsing the bicycle, since the head tube and the front frame are displaceable about separate, generally parallel axis, the collapsing operation is done with the front wheel on the ground without any strain on the person carrying out the operation simply and quickly collapsing the bicycle.

Further, whether a seat tube is equipped on the rear frame or the front frame, the collapsing operation remains effective and simple. Even further, when the bicycle is folded for storage, the first locking mechanism locks the head tube to front frame and the front fork to the head tube so they remain relatively rigid until released. Hence, the front fork does not wobble while the bicycle is being parked or in the parking position. Hence, the folded bicycle frame remains relatively stable.

These and other objects, features, aspects and advantages of the present invention will become more fully apparent from the following detailed description of the present invention when taken in conjunction with the accompanying drawings where like reference numerals denote corresponding parts throughout, in which:

DETAILED DESCRIPTION OF THE PREFERRED EMBODIMENTS

Figure 1:
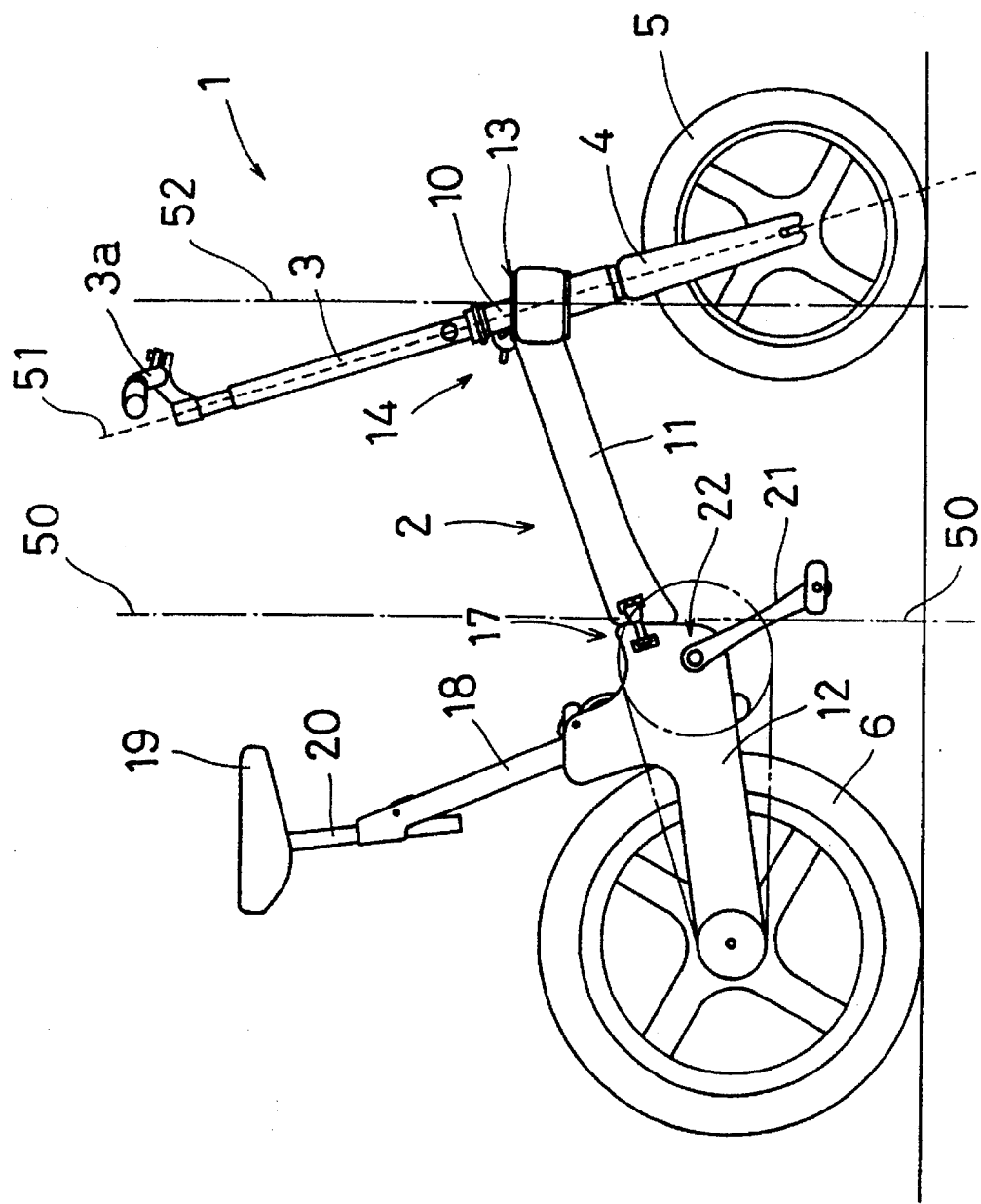
FIG. 1 is a side elevation of a bicycle frame in accordance with a first embodiment of the present invention having a front stem and a head tube which extends around the front stem.

In FIG. 1, a bicycle (1), in a first preferred embodiment of the invention, is equipped with a frame (2) which can be collapsed. At the front portion of the frame (2) is a front fork (4) that connects a steering stem (3), the stem (3) being mounted to the frame (2) to freely rotate. The front wheel (5) is supported on the leading edge of the front fork (4). Further, the rear wheel (6) is supported on the rear portion of the frame (2).

The frame (2) is primarily formed from a head tube (10), a front frame (11), and a rear frame (12). The front frame (11) is pivotably connected to the rear frame (12) by a hinge (16) (shown in FIG. 6), which will be described in greater detail below. The hinge (16) defines an axis (50), as shown in FIG. 1.

Within the head tube (10), the front fork (4) is supported to freely rotate around an axis (51) defined by the head tube (10). The front fork (4) is further connected to the stem (3), so that they rotate together within the head tube (10) about the axis (51). A handlebar (3a) is mounted to the upper end of the stem (3).

Figure 2:
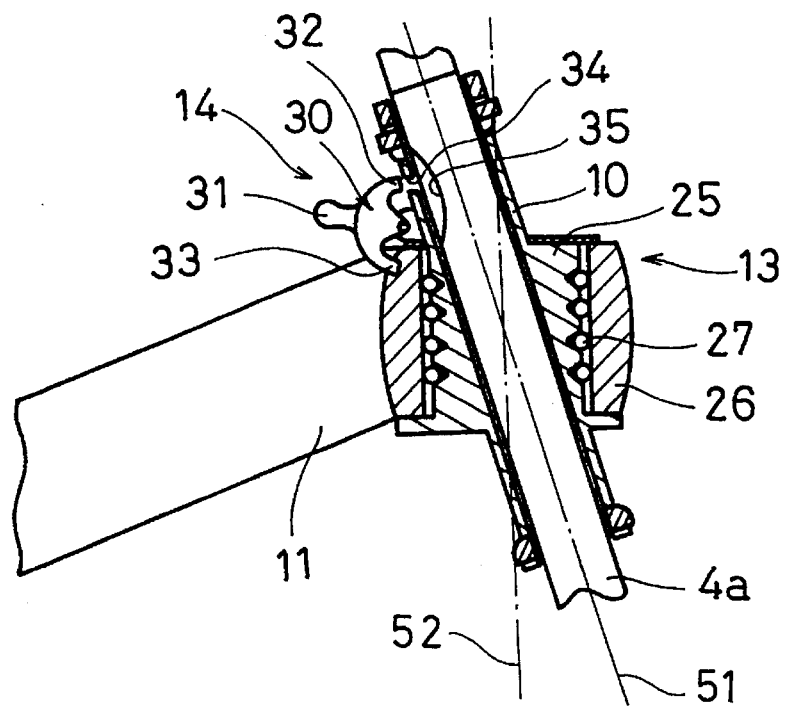
FIG. 2 is a fragmentary, part section, part elevation of a handlebar locking mechanism used in the embodiment depicted in FIG. 1, with the handlebar locking mechanism shown in a locked position where the head tube is locked to the frame of the bicycle preventing relative movement with respect to the bicycle frame.
Figure 3:
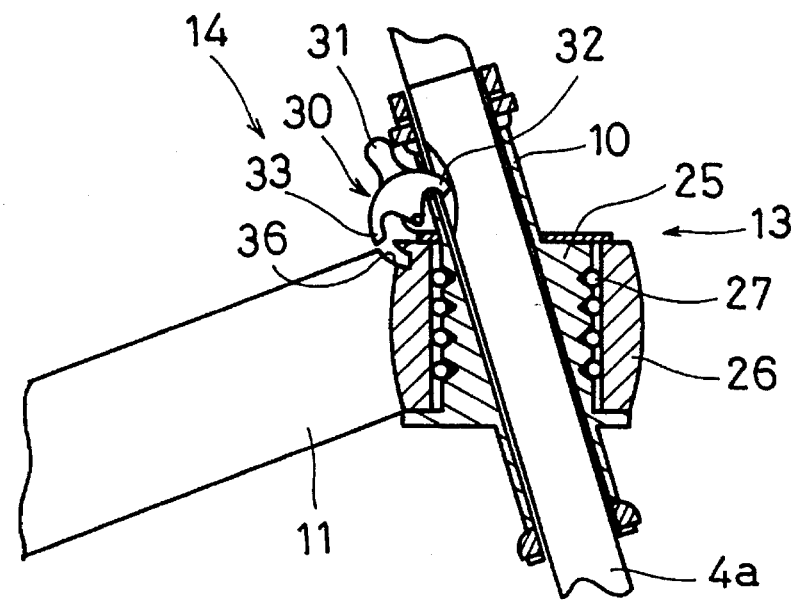
FIG. 3 is a fragmentary, part section, part elevation of the handlebar locking mechanism depicted in FIG. 2, with the handlebar locking mechanism shown in a lock release position where the head tube is now rotatable with respect to the bicycle frame, and the front stem of the bicycle is now locked in position relative to the head tube.
Figure 4:
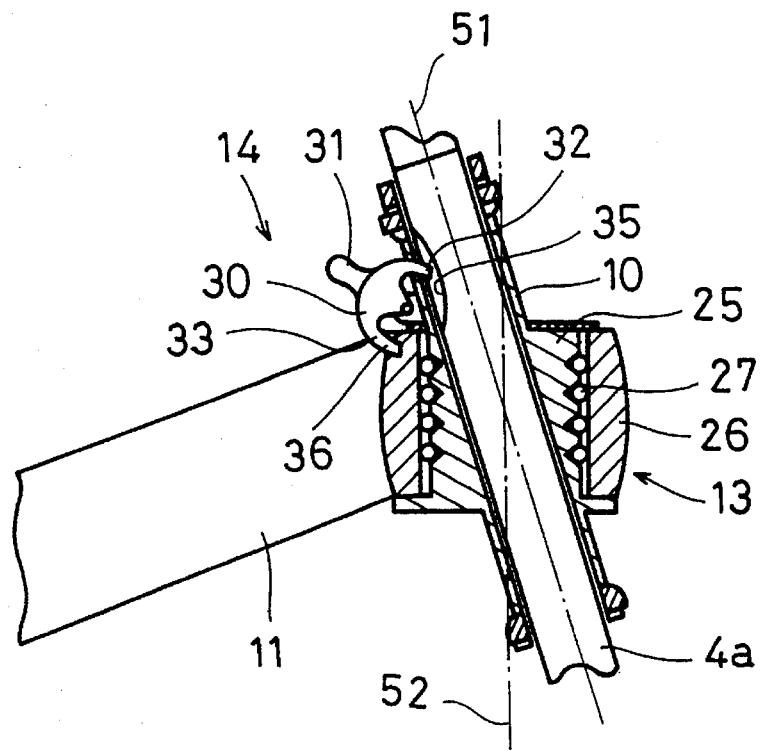
FIG. 4 is a fragmentary, part section, part elevation of the handlebar locking mechanism depicted in FIGS. 2 and 3, with the handlebar locking mechanism shown in a neutral position where both the head tube and the front stem are locked in position relative to the frame.

As is shown in FIGS. 2, 3 and 4, the head tube (10) is rotatably supported within the front frame (11) via a bearing (13). The head tube (10) is rotatable about an axis (52), the axis (52) defined by the bearing (13) which supports the head tube (10).

A handlebar lock mechanism (14) is mounted on the head tube (10). The handlebar lock mechanism (14) is selectively engageable with the front fork (4) and the front frame (11) to freely release or lock together the head tube (10), the front fork (4), and the front frame (11). Between the front frame (11) and the rear frame (12), the hinge (16) (FIG. 6) connects them to freely rotate perpendicular around the axis (50) is equipped. Further, on the other side of the hinge (16), a frame locking mechanism (17) (FIG. 5) is equipped.

On the rear frame (12), a seat tube (18) extending upward is fixed to freely move up and down. On the leading edge of the seat tube (18), a seat post (20) which fixes the saddle (19) to the top edge is fixed to freely move up and down. Further, on the front edge of the rear frame (12), a hangar portion (22) is formed, which rotatably supports a crankset gear (21). The rear portion of the rear frame (12) is forked-shaped and divided into two generally parallel section which support the rear wheel (6).

As shown in FIG. 2, the bearing (13) includes a rotatable support member (25) the rotatable support member (25) being fixed to the head tube (10). The bearing (13) further includes a head tube frame member (25) which is fixed to the leading edge of the front frame (11). Ball bearings (27) (or similar bearing material) is disposed in recesses formed between the rotatable support member (25) and the head tube frame member (25). The rotatable support member (25) is arranged generally parallel to the hinge portion (16) such that the axis (52) is generally parallel to the axis (50).

The handlebar locking mechanism (14) includes a swing lever (30) supported on the head tube (10) to freely rotate with the head tube (10) around the axis (52). The swing lever (30) is formed in a generally semi-circle shape. A handle portion (31) extends from the swing lever (30) outer periphery. Further, on either end of the semi-circle shape of the handle portion (31), protrusions (32, 33) are formed. On the head tube (10) opposite to one protrusion (32), a stoppage opening (34) is formed and on the fork stem (4a) of the front fork (4) a stoppage groove (35) is formed. As shown in FIG. 3, on the head tube frame member (25) opposite the protrusion (33), a stoppage groove (36) is formed.

The head tube (10) and the front frame (11) are locked together by the swing lever (30), when the swing lever (30) is in a locked position, as is shown in FIG. 2. The protrusion (33) engages the front frame (11) by extending into the stoppage groove (36), thus locking the head tube (10) in place with respect to the front frame (11). Hence, the fork stem (4a) rotates about the axis (51) with the axis (51) fixed with respect to the front frame (11) to allow normal tiding of the bicycle.

In FIG. 3, the swing lever (30) is depicted in a lock release position where the head tube (10) is free to rotate with respect to the front frame (11), about the axis (52). In the position shown in FIG. 3, the swing lever (30) the fork stem (4a) and the head tube (10) are locked together by the swing lever (30). In FIG. 3 the protrusion (32) extends into the stoppage groove (35) locking the fork stem (4a) to the head tube (10). As a result, the head tube (10) freely rotates about the axis (52) relative to the front frame (11).

As shown in FIG. 4, when the swing lever (30) is rotated to a neutral position generally midway between the lock position and the lock release position where the protrusion (32) is at least partially engaged with the stoppage groove (35) and the protrusion (33) is at least partially engaged from the stoppage groove (36). In the neutral position, the front frame (11), head tube (10), and the fork stem (4a) are all locked together, restricting relative movement of the elements. In the neutral position, when the bicycle is parked, the front wheel (5) does not wobble and the parking position is stable.

Figure 5:
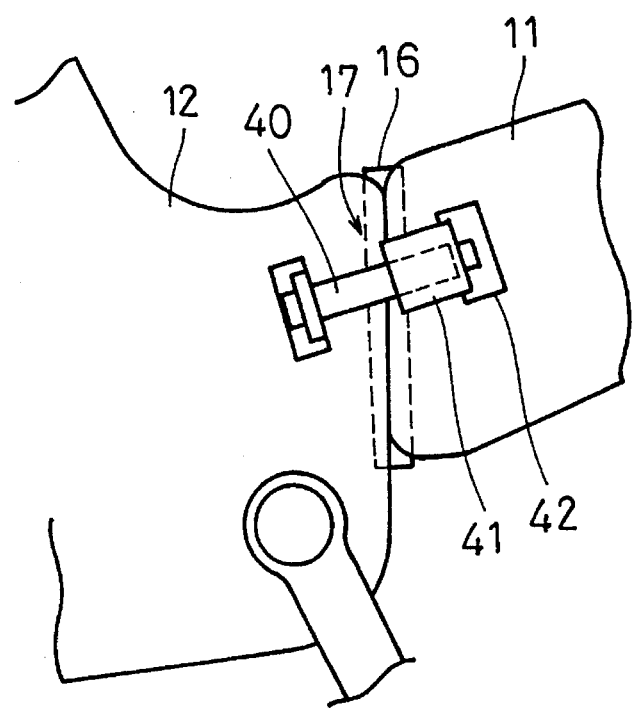
FIG. 5 is a fragmentary side elevation of a frame locking mechanism on a rearward portion of the bicycle frame depicted in FIG. 1.

Referring now to FIG. 5, the frame locking mechanism (17) includes a fixing pin (40) fixed to the rear frame (12) that extends to the front frame side (11), a stoppage portion (41) that is supported on the fixing pin (40) to freely move in the axial direction and also applies force in the rear direction through a spring (not shown), and a stoppage groove (42) formed on the front frame (11) to match the stoppage portion (41). The front frame (11) and the mar frame (12) are selectively locked together by the stoppage portion (41) extending into the stoppage groove (42). Further, the lock releases when the stoppage portion (41) is separated from the stoppage groove (42).

Next, the operations when collapsing and unfolding the bicycle of the above preferred embodiment will be explained.

Initially, when the bicycle (1) is to be collapsed, the swing lever (30) of the handlebar locking mechanism (14) is rotated from the lock position shown in FIG. 2 to the release position shown in FIG. 3. As a result, the head tube (10) and the front frame (11) freely rotate around the axis (52) via the bearing (13). Further, the stoppage portion (41) of the frame lock mechanism (17) is separated from the stoppage groove (42) and the front frame (11) rotates freely around the axis (50) relative to the rear frame (12) by the hinge (16).

Figure 6:
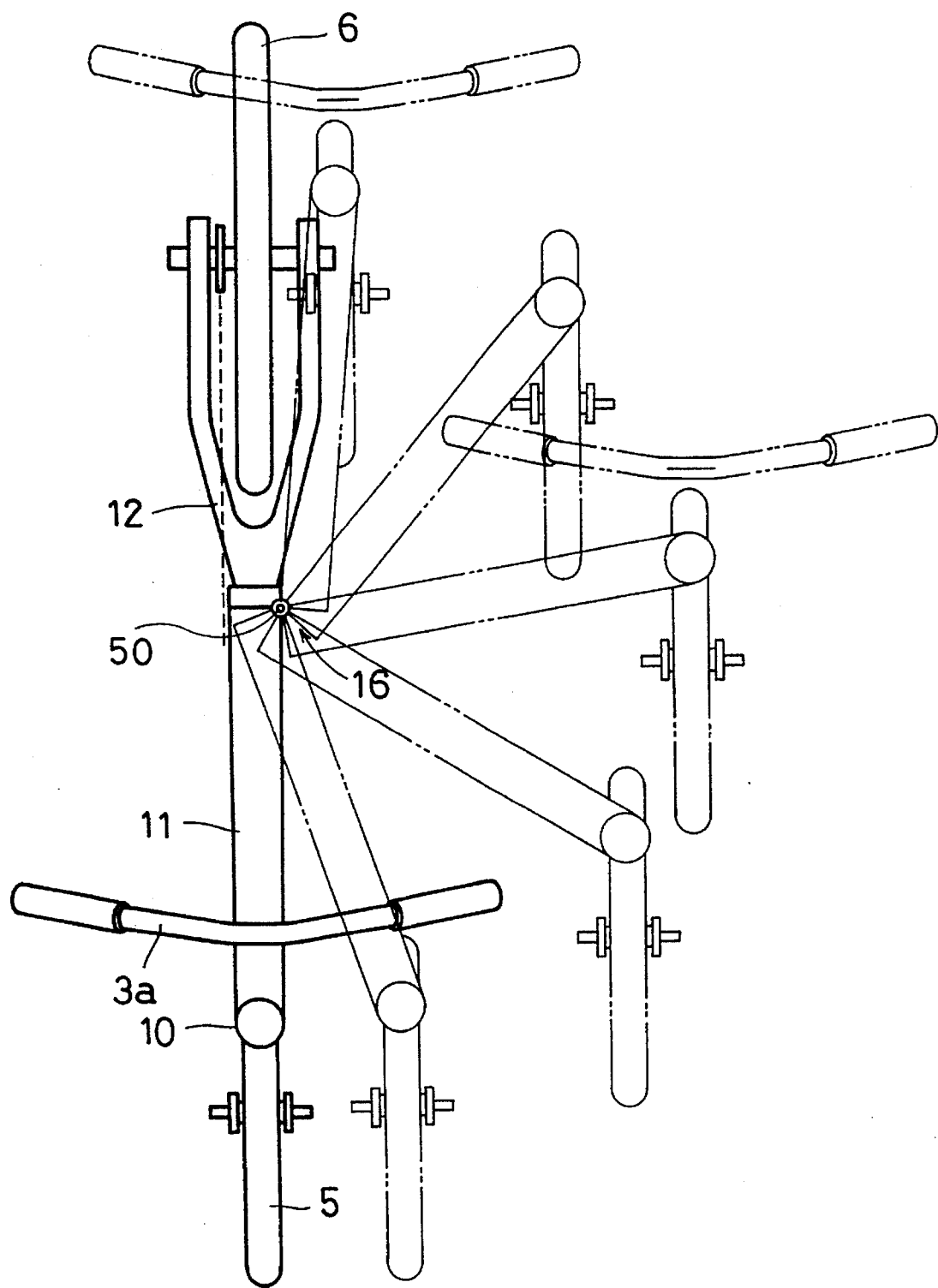
FIG. 6 is a top view of the bicycle frame depicted in FIG. 1 showing, in phantom, the frame collapsing operation.
Figure 7:
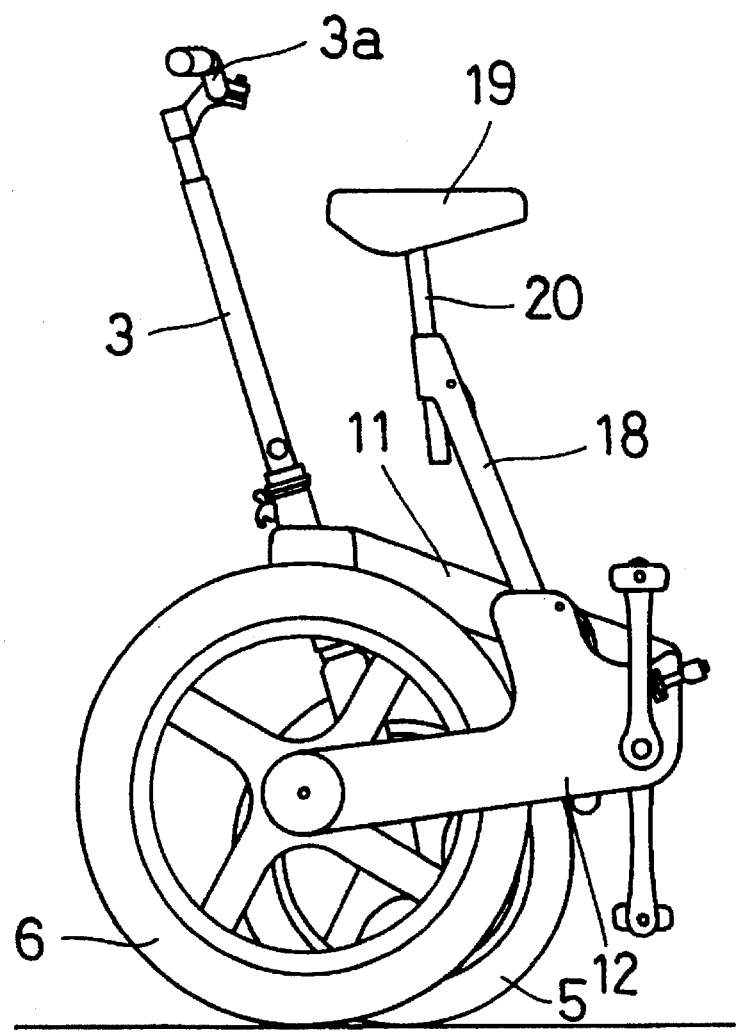
FIG. 7 is a side elevation of the bicycle frame depicted in FIG. 1, showing the bicycle frame in a collapsed state.
Figure 8:
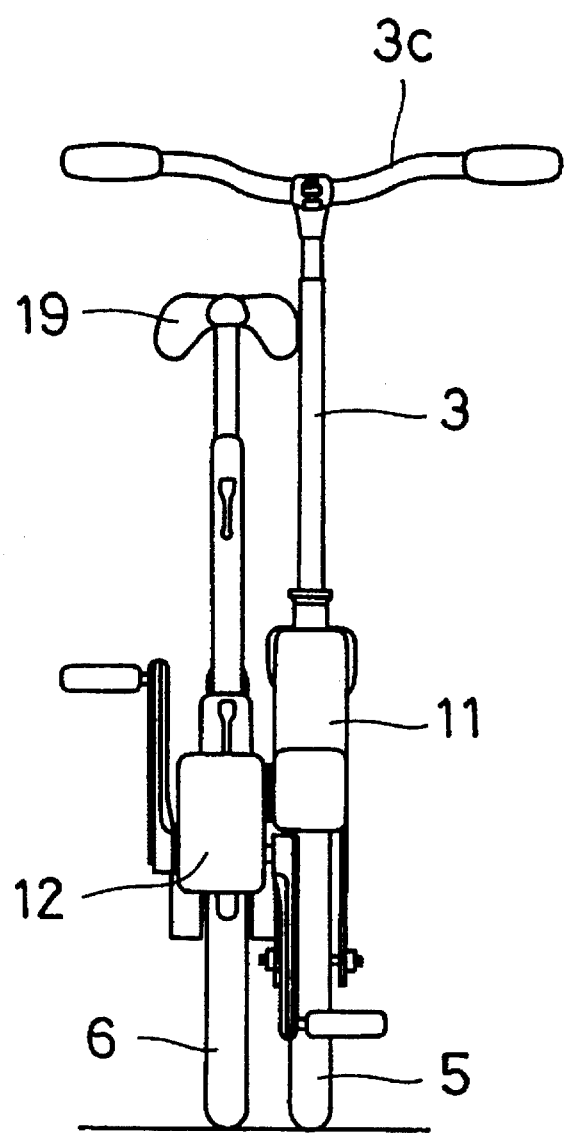
FIG. 8 is a front elevation of the bicycle frame depicted in FIGS. 1 and 7, showing the bicycle frame in the collapsed state.

As shown in FIG. 6, under this condition, the handlebar (3a) is held in place due to the position of the locking mechanism (14) and the front frame (11) folded around the axis (50) relative to the rear frame (12). When this operation is done, the head tube (10) can rotate perpendicular around the axis (52) relative to the front frame (11) which makes it possible for the handlebar (3a) to rotate while the bicycle is being collapsed and the front wheel (5) to freely rotate. Consequently, by turning the front wheel (5), no strain is placed on the person collapsing the bicycle and, as shown in FIG. 7 and 8, the bicycle (1) can be quickly collapsed into a compact folded shape.

In contrast, when the bicycle is returned from a collapsed state to a rideable state, it is only necessary to hold the handlebar (3a) and extending the front frame (11). With the front wheel (5) contacting the ground it is easy and simple to unfold the bicycle and ride it.

Here, because the head tube (10) and the front frame (11) freely rotate parallel to each other about the axis (52) and the axis (50) when the bicycle is collapsed, the head tube is able to freely rotate relative to the front frame (11). Because of this, the bicycle can be collapsed by touching the front wheel (5) to the ground and turning it without the person straining themselves making it possible to simply and quickly collapse the bicycle.

Figure 9:
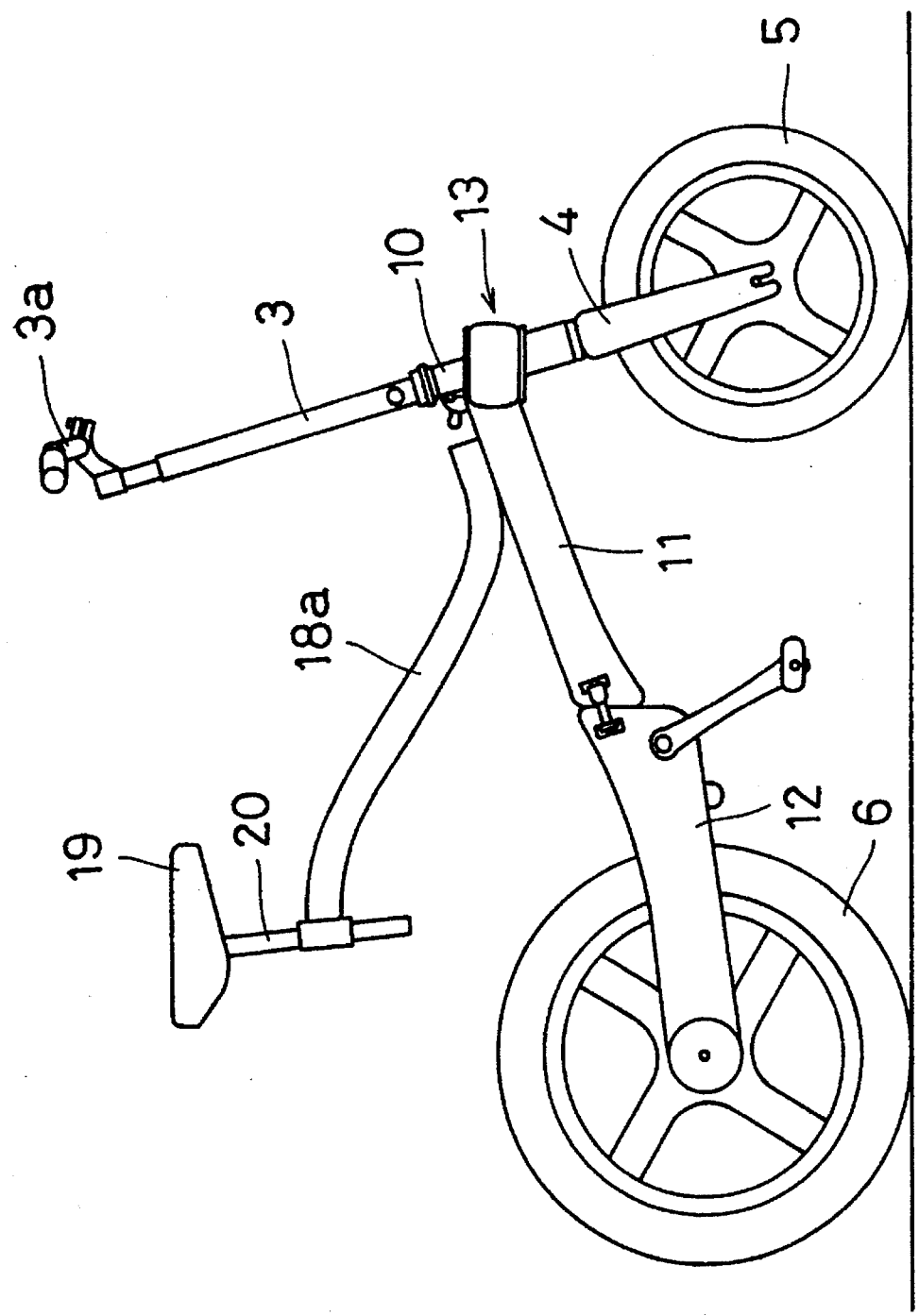
FIG. 9 side elevation of a bicycle frame, similar to FIG. 1, showing a bicycle frame in accordance with a second embodiment of the present invention.

As shown in FIG. 9, in place of the seat tube (18), a seat tube (18a) which curves from the front frame (11) and extends in a diagonal direction can be equipped. The base of the seat robe (18a) is fixed to the front frame (11) and on that leading edge the seat post (20) is fixed to be able to move up and down.

In this preferred embodiment, the bicycle can be compactly in the same way. Further, because the seat tube (18a) extends away from the front frame (11), interference between the rear wheel (6) as with the seat tube (18) is not considered and the bicycle is designed so the up and down position of the saddle (19) can be freely changed.

EFFECT OF THE INVENTION

In the frame for a collapsible bicycle related to this invention, the head tube (10) rotates in the same direction as the collapsible axis relative to the front frame (11). Therefore, the person will not strain themselves making it possible to simply and quickly collapse the bicycle.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed:

1. A collapsible bicycle frame comprising:

a front frame member having a head tube frame member rigidly attached to a forward section thereof, said head tube frame member having a bore formed therein defining a first axis;

a rear frame member configured to support a rear wheel, hinged to said front frame member for rotation about a second axis that is generally vertical when the bicycle frame is upright and in a generally rideable position;

a rotatable support member supported within said head tube frame member to be rotatable about said first axis, said rotatable support member having a bore defining a third axis inclined at an acute angle with respect to said first axis such that said first axis and said third axis intersect at a single point within said head tube frame member;

a front fork stem configured to support a front wheel supported in said rotatable support member, said front fork stem being rotatable in said rotatable support member about said third axis;

a first locking mechanism disposed on said rotatable support member, said first locking mechanism having a lock position and a release position, said first locking mechanism restricting rotation of said rotatable support member with respect to said head tube frame member when in said lock position, said first locking mechanism permitting rotation of said rotatable support member with respect to said head tube frame member when in said release position; and a second locking mechanism which selectively locks said front frame member and rear frame member restricting relative movement therebetween.

2. A collapsible bicycle frame as in claim 1 wherein said rear frame member further comprises a seat tube configured to support a seat and a hangar portion that rotatably supports a gear crankset.

3. A collapsible bicycle frame as in claim 1 wherein said front frame member further comprises a seat tube configured to support a seat, and said rear frame member further comprises a hangar portion that supports a gear crankset.

4. A collapsible bicycle frame as in claim 1, wherein said first locking mechanism has a second lock position, said first locking mechanism restricting rotation of said front fork stem with respect to said rotatable support member when in said second lock position.

5. A collapsible bicycle frame as in claim 1, wherein said first axis is generally vertical, and generally parallel to said second axis.

* * * * *